(12) United States Patent
Nellums et al.

(10) Patent No.: US 10,495,010 B2
(45) Date of Patent: Dec. 3, 2019

(54) DAMAGE PROTECTION FOR MULTI-FUNCTION AXLE

(71) Applicant: Dana Heavy Vehicle Systems Group, LLC, Maumee, OH (US)

(72) Inventors: Richard Nellums, Portage, MI (US); Donald J. Remboski, Ann Arbor, MI (US); Steven J. Wesolowski, Waterville, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/238,088

(22) Filed: Aug. 16, 2016

(65) Prior Publication Data

US 2018/0051637 A1     Feb. 22, 2018

(51) Int. Cl.
| | |
|---|---|
| *B60K 17/36* | (2006.01) |
| *F02D 41/26* | (2006.01) |
| *F02D 41/02* | (2006.01) |
| *F02D 11/10* | (2006.01) |
| *B60W 30/184* | (2012.01) |
| *F02D 41/00* | (2006.01) |

(52) U.S. Cl.
CPC .......... *F02D 41/0002* (2013.01); *B60K 17/36* (2013.01); *F02D 11/107* (2013.01); *F02D 41/021* (2013.01); *F02D 41/26* (2013.01); *B60W 30/184* (2013.01); *F02D 2200/101* (2013.01); *F02D 2200/1002* (2013.01); *F02D 2250/26* (2013.01)

(58) Field of Classification Search
CPC .... F02D 41/0002; F02D 41/021; F02D 41/26; F02D 11/107; F02D 2200/1002; F02D 2200/101; F02D 2250/26; B60K 17/36; B60W 30/184; B60W 10/06; B60W 2422/00; B60W 2420/22; B60W 2510/1015; B60W 2510/1025; F16H 59/38; F16H 59/14; F16H 2061/124; B60Y 2400/307
See application file for complete search history.

(56) References Cited

U.S. PATENT DOCUMENTS

| | | |
|---|---|---|
| 6,349,252 B1 | 2/2002 | Imanishi |
| 6,526,816 B2 | 3/2003 | Genise |

(Continued)

FOREIGN PATENT DOCUMENTS

| | | |
|---|---|---|
| EP | 0137247 A2 | 4/1985 |
| EP | 0512726 A2 | 11/1992 |

*Primary Examiner* — Joseph J Dallo
*Assistant Examiner* — Scott A Reinbold
(74) *Attorney, Agent, or Firm* — Marshall & Melhorn, LLC

(57) ABSTRACT

A method of protecting a multi-function drive axle system from damage, comprising the steps of: determining the axle torque and speed from sensors positioned on the multi-function drive axle system; using the axle torque and speed to approximate damage values for the driveline of the multi-function drive axle system; comparing the approximated values of driveline damage with driveline damage durability targets; identifying if the approximated values of driveline damage exceed the driveline damage durability targets; and limiting the engine torque and/or speed to produce an axle torque and speed corresponding to driveline damage values that do not exceed the driveline damage durability targets.

15 Claims, 3 Drawing Sheets

(56) References Cited

U.S. PATENT DOCUMENTS

| | | | |
|---|---|---|---|
| 6,615,126 B1 | 9/2003 | Potter | |
| 6,814,053 B2 | 11/2004 | Hawkins | |
| 6,842,689 B2 | 1/2005 | Andres | |
| 6,873,917 B2 | 3/2005 | Ulrich | |
| 7,076,396 B2 | 7/2006 | Klausner | |
| 7,283,932 B2 | 10/2007 | Olsson | |
| 7,318,007 B2 | 1/2008 | Barkhoudarian | |
| 7,356,401 B2 | 4/2008 | Romer | |
| 7,421,327 B2 | 9/2008 | Romer | |
| 7,440,832 B2 | 10/2008 | Steen | |
| 7,914,250 B2 | 3/2011 | Behera | |
| 7,953,559 B2 | 5/2011 | Sundermeyer | |
| 8,073,653 B2 | 12/2011 | Suzuki | |
| 8,234,050 B2 | 7/2012 | Burns | |
| 8,523,738 B2 | 9/2013 | Morscheck | |
| 8,911,321 B2 | 12/2014 | Ziech et al. | |
| 9,014,918 B2 | 4/2015 | Hagen | |
| 2002/0095985 A1* | 7/2002 | Genise | G01M 13/021 73/162 |
| 2007/0299592 A1* | 12/2007 | Romer | B60K 28/16 701/69 |
| 2008/0227596 A1 | 9/2008 | Schifferer | |
| 2014/0057751 A1 | 2/2014 | Mellet et al. | |

* cited by examiner

DAMAGE PROTECTION FOR MULTI-FUNCTION AXLE

FIELD

The present disclosure relates to a method for protecting a multi-function drive axle system from damage by limiting excessive engine torque and speed.

BACKGROUND

A conventional tandem drive axle system for commercial vehicles includes front and rear axle assemblies and an intermediate drive shaft assembly connecting the two axle assemblies. The front and rear axle assemblies each include a pair of axle half shafts extending therefrom on which one or more wheels of a vehicle are mounted. The axle half shafts in each axle assembly are driven by a wheel differential.

Tandem drive axle systems can employ an inter-axle differential to divide power between the front and rear axle assemblies. The inter-axle differential enables speed differences between the drive axles to balance the torque between the drive axles during the vehicle cornering, to compensate for tire size differences, etc.

Components of the tandem drive axle system may be selected based on a gear reduction ratio present in an axle. Axle ratios may be of a two-speed configuration to permit the vehicle to operate in a low speed and high torque manner or in a high speed and low torque manner. It is preferred to drive both axles when the low speed and high torque manner of operation is desired and it is advantageous to operate only a single axle of the tandem drive axle system when the high speed and low torque manner of operation is desired.

Additionally, an axle can be disengaged from the drive axle system when the tractive effort of all axles is not required. Disengaging the axle can result in reduced spin loses during highway cruise conditions. However, the engaged axle can experience increased torque and cycles leading to increased accumulated damage and reduced durability.

When the torque is increased on an axle, the transfer of torque between two relatively moving and engaged components of the driveline can cause damage to gear teeth and bearings of the driveline, reducing the durability and lifespan of the axle system.

Therefore, it would be advantageous to prevent damage to the axle system by limiting the damage to the driveline caused by excessive torque and speed.

SUMMARY

A method of protecting a multi-function drive axle system from damage, comprising the steps of: determining the axle torque and speed from sensors positioned on the multi-function drive axle system; using the axle torque and speed to approximate damage values for the driveline of the multi-function drive axle system; comparing the approximated values of driveline damage with driveline damage durability targets; identifying if the approximated values of driveline damage exceed the driveline damage durability targets; and limiting the engine torque and/or speed to produce an axle torque and speed corresponding to driveline damage values that do not exceed the driveline damage durability targets.

BRIEF DESCRIPTION OF THE DRAWINGS

The above, as well as other advantages of the present embodiments will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments The embodiments relate to a method for limiting damage to a multi-function axle system. The multi-function axle system has at least two axle assemblies wherein one of the axle assemblies can be selectively engaged/disengaged. In one embodiment, the multi-function axle system is a tandem drive axle system. Particularly the multi-function axle system can be as disclosed in U.S. Pat. Nos. 8,523,738 and 8,911,321 hereby incorporated by reference. The above-referenced U.S. Pat. Nos. 8,523,738 and 8,911,321 disclose exemplary embodiments of a multi-function axle system. However, it is understood the drive axle system may include fewer or more assemblies or components or have various configurations.

Figure 1:
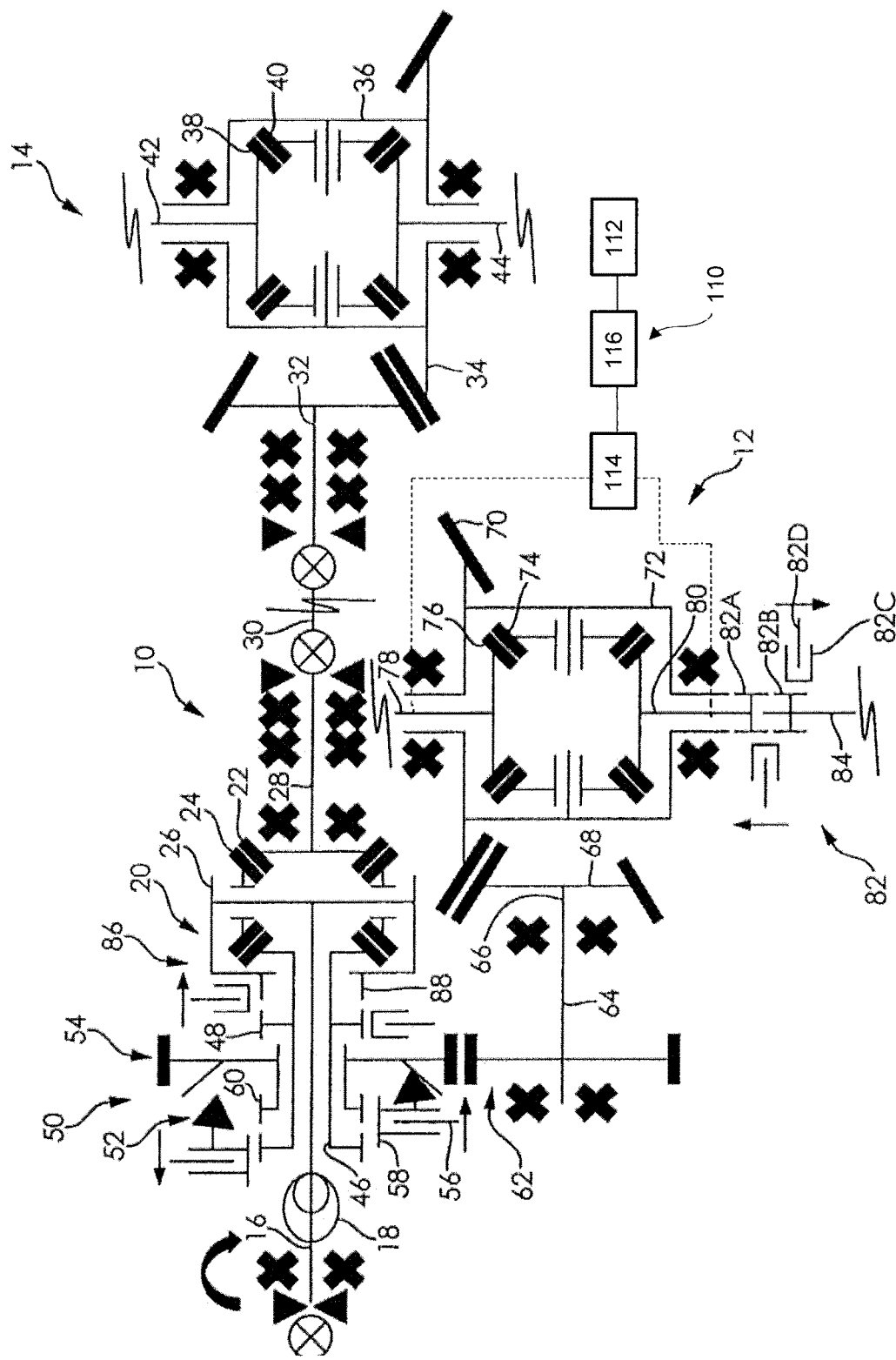
FIG. 1 is a schematic view of an embodiment of a tandem drive axle system.

Turning now to FIG. 1, one embodiment of a drive axle system 10 is schematically depicted. The drive axle system 10 is a tandem drive axle system. The drive axle system 10 includes a forward axle system (or axle assembly) 12 and a rear axle system (or axle assembly) 14. Rotational energy is provided to the tandem drive axle system 10 through an input shaft 16 that is rotated by an internal combustion engine (not shown). A gerotor pump 18 is rotated by the input shaft 16. The gerotor pump 18 pumps lubricant to rotating parts in the forward axle system 12 regardless of the operating condition of the forward axle system 12, which can be selectively engaged and disengaged.

The input shaft 16 is connected to an interaxle differential (IAD) 20. The IAD 20 comprises at least two side gears 22 and at least two pinion gears 24, with the side gears 22 and pinion gears 24 being in driving engagement with one another. The side gears 22 and pinion gears 24 are located within an IAD carrier 26. The IAD 20 provides differential action between the forward axle system 12 and the rear axle system 14.

An output shaft 28 connected to one of the IAD side gears 22 is connected to a first end of a propeller shaft 30. The propeller shaft 30 extends between the forward axle system 12 and the rear axle system 14. A second end of the propeller shaft 30 is connected to a rear pinion gear 32. The rear pinion gear 32 is drivingly connected to a rear ring gear 34. The rear ring gear 34 is connected to a rear differential 36.

The rear differential 36 includes at least two side gears 38 and at least two pinion gears 40 to permit differential rotation between the wheels (not shown) on a right axle shaft 42 and a left axle shaft 44 connected to the side gears 38.

A first concentric shaft 46 is radially located about the input shaft 16. The first concentric shaft 46 is connected to one of the IAD side gears 22. The first concentric shaft 46 also carries a dog clutch gear 48.

A synchronizer system 50 is radially concentric with the first concentric shaft 46. The synchronizer system 50 comprises a cone assembly 52. The cone assembly 52 may be selectively moved in the axial direction into and out of engagement with a plate assembly 54 a portion of which is angled to receive the cone assembly 52.

The cone assembly 52 is rotatable and via the axial movement, it may be brought into selective engagement with the plate assembly 54. The rotation of the cone assembly 52 is imparted to the plate assembly 54, which causes the plate assembly 54 to rotate. As the cone assembly 52 is brought into additional engagement with the plate assembly 54, the plate assembly 54 is matched or substantially matched to the same rotational speed of the cone assembly 52.

At a predetermined time, such as when the rotational speed of the plate assembly 54 and cone assembly 52 are matched or substantially matched via substantial engagement of the plate and cone assemblies 52, 54, a shift fork 56 moves a dog clutch ring 58 on the dog clutch gear 48 also to a synchronizer gear 60. The dog clutch ring 58 rotationally connects the synchronizer gear 60 and the dog clutch gear 48.

While a synchronizer system is described above, dog clutches, friction plate clutches or an over-running clutches may be used instead of the synchronizer system.

The synchronizer system 50 is selectively connected to, and thus selectively rotates, a drop gear set 62. The drop gear set 62 is connected to an input shaft 64 of the forward axle system 12. The input shaft 64 is provided with, or connected to, a pinion shaft 66. The pinion shaft 66 has a pinion gear 68. The pinion gear 68 is connected to a differential ring gear 70. The ring gear 70 is connected to a differential carrier 72. At least two pinion gears 74 and at least two side gears 76 are located within the differential carrier 72.

Shafts extend into the differential carrier 72 and connect with the side gears 76. The shafts extend outboard the differential carrier 72. The shafts may be full length shafts or they may be stub shafts. First and second stub shafts 78, 80 are shown extending from the carrier 72.

A clutch 82, such as a dog-type clutch, may be located on the second stub shaft 80. The clutch 82 may selectively move along the stub shaft 80 for connecting and disconnecting the stub shaft 80 with an axle shaft 84 rotationally supporting at least one wheel and tire (not shown).

The clutch 82 may include a first set of splines or gears 82A that are selectively connected with a second set of splines or gears 82B via a clutch ring 82C. The clutch ring 82C selectively connects the gears 82A, 82B when moved by a shift fork 82D.

A selectively engagable clutch 86 may be provided at the interaxle differential 20 for locking the output shaft 28 to the input shaft 16. In the depicted embodiment, the first concentric shaft 46 is selectively connected to the IAD carrier 26 with the clutch 86. The IAD carrier 26 is provided with a set of teeth, a gear, or splines; teeth 88 will be used in the following description. The clutch 86, such as a dog-type clutch, is designed to selectively engage and disengage with the IAD housing teeth 88. The clutch 86 selectively joins the IAD carrier teeth 88 with a gear 48 on the concentric shaft 46.

Based on the foregoing, it can be appreciated that the tandem drive axle system 10 can be operated in different modes. Typically, the rear axle system 14 is engaged in the drive-line full time and the forward axle system 12 is engaged for only intermittent use, such as for startup and low speed traction conditions. The forward axle system 12 is disengaged and allowed to idle most of the time.

The tandem has three modes of operation: first, 6×2 with the forward axle system 12 disconnected; second, 6×4 with the IAD open with the forward and rear axle systems 12, 14 providing drive; and third, 6×4 with the IAD locked and the forward and rear axle systems 12, 14 providing drive.

In the first mode of operation, the synchronizer system 50 is not engaged so rotational power transfers from the engine to the rear axle system 14 through the locked IAD 20; no rotational power is transmitted to the forward axle system 12. In addition, the clutch 86 between the stub shaft 80 and axle shaft 84 is unlocked so that the forward axle system 12 is not rotating, thus reducing, or preventing, oil churning losses and spin loses.

In the second mode of operation, the synchronizer system 50 is engaged thus connecting both the forward and the rear axle systems 12, 14 to the engine. The IAD 20 is unlocked. In other words, the differential carrier 26 is not locked to the concentric shaft 46 with the interaxle differential clutch 86. Further, the fork 82D moves the ring 82C to connect the stub shaft 80 and the axle shaft 84 so that they rotate together.

In the third mode of operation, the clutches 82, 86 on the concentric shaft 46 and the stub shaft 80 of the axle shaft 84 of the forward axle system 12 are engaged. Thus, the forward axle system 12 provides rotational power to the forward wheels and tires. The IAD 20 is locked so that the forward and rear axle systems 12, 14 are driven at the same speed. In other words, the differential carrier 26 is locked to the concentric shaft 46 with the interaxle differential clutch 86. Further, the fork 82D moves the ring 82C to connect the stub shaft 80 and the axle shaft 84 so that they are rotate together.

Additionally, the drive axle system 10 can include a control system 110. The control system 110 includes a controller 112 and one or more sensors 114 or a sensor array. The sensors 114 can be intelligent sensors, self-validating sensors and smart sensors with embedded diagnostics. The controller 112 is configured to receive signals and communicate with the sensors 114.

The one or more sensors 114 are used to monitor performance of the drive axle system 10. The sensors 114 can collect data from the driveline of the vehicle including, but not limited to, the torque and speed of the axles. The speed of rotation and the torque are indicative of the speed of rotation and torque of the engine. In one embodiment, the sensors 114 are mounted along the axles of the drive axle system 10, but can also be mounted elsewhere on the vehicle.

In one embodiment, the control system 110 includes additional, discrete sensors 114 beyond sensors already included in other components of the vehicle. In another embodiment, no additional sensors or sensed data relay systems are required beyond what are already included in the drive axle system 10.

The control system 110 can also include a vehicle communication datalink 116 in communication with the sensors 114 and the controller 112. The sensors 114 generate signals that can be directly transmitted to the controller 112 or transmitted via the datalink 116 or a similar network. In one embodiment, the controller 112 can be integrated into an existing controller system in the vehicle including, but not limited to, an engine controller, a transmission controller, etc. or can be a discrete unit included in the control system 110. The controller 112 may communicate a vehicle communication datalink message (comm. link J1939 or the like) to other components of the drive axle system 10 including, but not limited to, the engine.

In one embodiment, the controller 112 is an electrical control unit (ECU). The ECU herein can be configured with hardware alone, or to run software, that permits the ECU to send, receive, process and store data and to electrically communicate with sensors 114, other components of the drive axle system 10 or other ECUs in the vehicle.

Additionally, the controller 112 can include a microprocessor. The microprocessor is capable of receiving signals, performing calculations based on those signals and storing data received from the sensors and/or programmed into the microprocessor.

When the drive axle system 10 is in a mode where there is only one engaged axle, the engaged axle can experience and increase torque and damaging cycles. To protect the drive axle system 10 from damage, the torque and engine speed can be limited when necessary.

In one embodiment, the sensors 114 obtain speed and torque information by taking direct, non-predictive measurements of the speed (Sm) and torque (Tm) of the axles of the drive axle system 10. The sensors 114 communicate the measured speed and torque Sm, Tm to the controller 112. The measured values Sm, Tm can be sent directly from the sensors 114 to the controller 112 or the datalink 116 can be used to communicate the measured speed and torque Sm, Tm to the controller 112. The sensors 114 can be designed to obtain other data relating to the operating conditions of the drive axle system 10 beyond the speed and torque of the axle and the sensors 114 can send signals communicating this information to the controller 112 by similar means.

The controller 112 receives the speed and torque values Sm, Tm, or other operating conditions values, obtained by the sensors 114 and, utilizing a simple approximation method, approximates the damage caused to the driveline. The damage to the driveline can include the damage to the gears (Dg) and/or the damage to the bearings (Db) of the drive axle system 10 by the speed, torque or other operating conditions of the drive axle system 10. In one embodiment, the damage Dg is the amount of gear tooth bending, pitting, etc. Additionally, the damage can include the amount of damage or wear to the bearing Db. Additional damage values relating to the damage to the driveline can be approximated based on the other operating conditions obtained by the sensors 114.

In one embodiment, the simple approximation method bases the damage values Dg, Db on historical test data results programmed into the microprocessor. This collected test data is based on a number of factors monitored in the drive axle system 10 in test conditions that predicts the durability and life of the axle. The microprocessor can also contain operating tables, algorithms and other control logic required to perform the simple approximations.

In one embodiment, the controller 112 compares the approximated damage values Dg, Db to known durability targets Dgt, Dbt. The durability targets Dgt, Dbt are known values for the amount of damage to the driveline, including the gears and/or bearings, for which the drive axle system 10 can withstand and still meet the required lifespan of the drive axle system 10. These durability targets Dgt, Dbt are based on the individual needs of each vehicle depending on the application and purpose of the vehicle and the expected lifespan of the vehicle.

Additionally, the control system 110 can monitor the damage values Dg, Db individually and/or as an accumulation against the durability targets Dgt, Dbt. A cumulative database can be established in the control system 112 and stored by the microprocessor. This cumulative data set can then be used to adjust the durability target Dgt, Dbt accordingly and provide additional basis for how the simplified approximation is realized.

Figure 2:
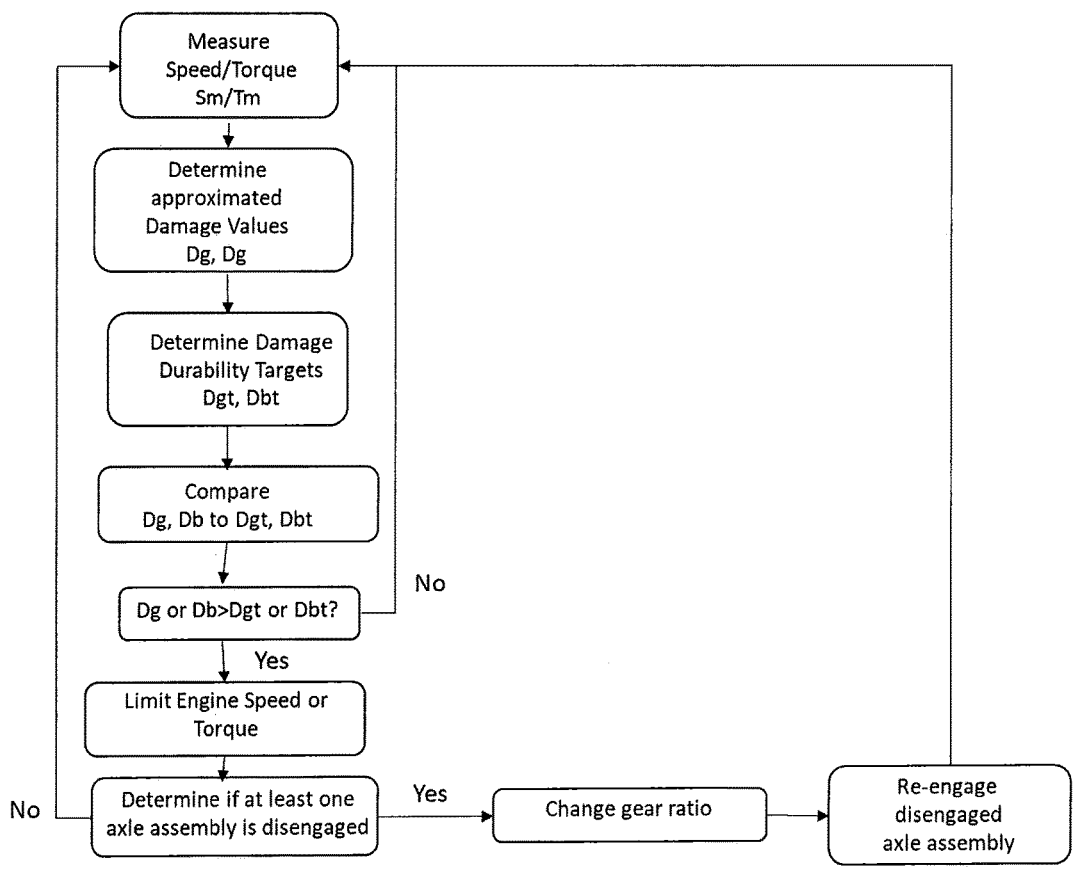
FIG. 2 is a flow diagram depicting one embodiment of the method of protecting a multi-function drive axle system from damage by limiting excessive engine torque and speed.

The controller 112 can compare the approximated damage values Dg, Db to the durability target values Dgt, Dbt. If the approximated values Dg, Db exceed the durability target values Dgt, Dbt, the controller 112 can send signals to drive axle system 10 to reduce the torque and speed of the engine such that the measured speed and torque Tm, Sm produce Dg, Db values less than the Dgt, Dbt as depicted in the flow diagram in FIG. 2.

Figure 3:
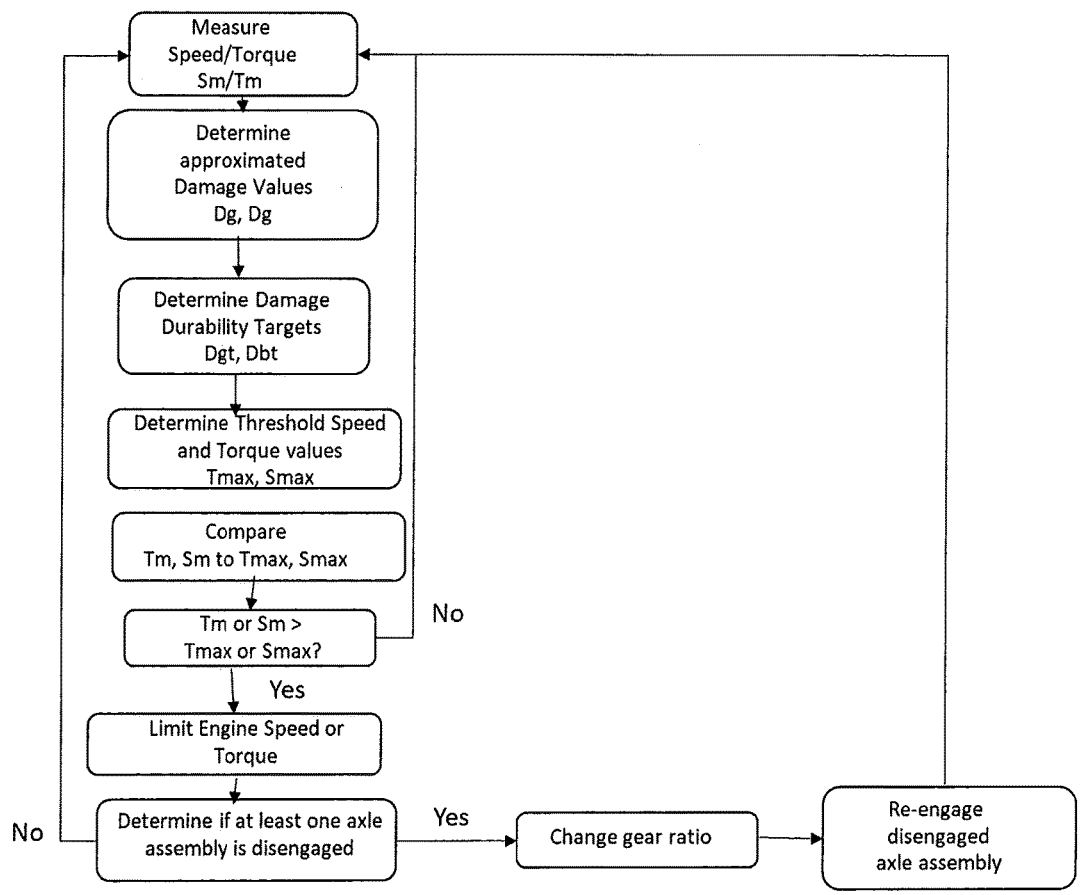
FIG. 3 is a flow diagram depicting another embodiment of the method of protecting a multi-function drive axle system from damage by limiting excessive engine torque and speed.

Additionally, the controller 112 can use the measured values Tm, Sm and the simple approximation method to determine threshold values for the speed and torque Tmax, Smax that do not result in damage values Dg, Db that exceed the durability targets Dgt, Dbt. If the sensors 114 obtain measured values Tm, Sm that exceed the speed and torque threshold values Tmax, Smax, the controller 112 can signal the drive axle system 10 to reduce the engine torque and speed such that the measured speed and torque Sm, Tm are less than the threshold speed and torque Smax, Tmax as depicted in the flow diagram in FIG. 3.

The engine torque can be managed by various methods including, but not limited to, throttle override/cutoff, spark reduction, etc. Typically, torque demands are made by the vehicle operator directly or indirectly via cruise control, etc. If the operator indicates throttle demand resulting in Tm or Dg/Db values in excess of the threshold Tmax or Dgt/Dbt, then actual engine torque could be limited by overriding the throttle request, in a manner similar to overriding engine behavior during cruise control operation or during transmission shifting.

The engine speed can be limited by various methods known in the art. By limiting the engine speed of the drive axle system 10, the rate of damaging cycles also is reduced.

When the drive axle system 10 is in a mode where there is one engaged axle, the engaged axle can experience increase torque and damaging cycles where the Sm, Tm or Dg/Db values are in excess of the threshold values Smax, Tmax or Dgt/Dbt. If the vehicle operator then requests additional torque or speed, the control system 112 overrides this request. The vehicle operator may note the expected requested torque is not being provided and the operator would likely change the transmission to a lower gear. Changing the transmission to a lower gear creates the opportunity to re-engage the disengaged axle and restore full engine torque, or for at least slowing the vehicle down and continuing at a lower speed with limited engine torque (and slower cycle accumulation) preventing further damage to the drive axle system 10.

In accordance with the provisions of the patent statutes, the present invention has been described in what is considered to represent its preferred embodiments. However, it should be noted that the invention can be practiced otherwise than as specifically illustrated and described without departing from its spirit or scope.

We claim:

1. A method of protecting a multi-function drive axle system from damage including at least two axle assemblies wherein a first axle assembly is engaged and a second axle assembly is selectively engaged, comprising the steps of:

determining the axle torque and speed from sensors positioned on the multi-function drive axle system;
using the axle torque and speed to approximate damage values for a driveline of the multi-function drive axle system;
comparing the approximated values of driveline damage with driveline damage durability targets; and
identifying if the approximated values of driveline damage exceed the driveline damage durability targets;
determining if an interaxle differential (IAD) in the multi-function drive axle system is locked in order to determine if the second axle assembly is disengaged;
limiting engine torque or speed to produce an axle torque and speed corresponding to driveline damage values that do not exceed the driveline damage durability targets;
lowering the gear ratio of the first axle assembly; and
upon determining that the second axle assembly is disengaged, re-engaging the second axle assembly.

2. The method of claim 1, further comprising limiting engine torque or speed to produce an axle torque and speed corresponding to driveline damage values that do not exceed the driveline damage durability targets.

3. The method of claim 1, wherein the step of determining the axle torque and speed from sensors positioned on the multi-function drive axle system includes taking direct, non-predictive measurements of the axle torque and speed.

4. The method of claim 1, wherein the multi-function drive axle system is a tandem drive axle system.

5. The method of claim 1, wherein the damage to the driveline includes damage to one or more gear teeth or damage to one or more bearings.

6. The method of claim 5, wherein the damage to the gear teeth includes tooth bending or pitting.

7. The method of claim 1, further comprising the step of accumulating driveline damage values to create a cumulative database utilized to adjust the driveline durability targets.

8. The method of claim 2, wherein the step of limiting the engine torque or speed includes overriding a throttle request by a vehicle operator.

9. A method of protecting a multi-function drive axle system from damage, the multi-function drive axle system including at least two axle assemblies wherein a first axle assembly is engaged and a second axle assembly is selectively engaged, comprising the steps of:

determining the axle torque and speed from sensors positioned on the multi-function drive axle system;
using the axle torque and speed to approximate damage values for a driveline of the multi-function drive axle system;
comparing the approximated values of driveline damage with driveline damage durability targets;
using the driveline damage durability targets to obtain threshold value for axle torque and speed;
identifying if the axle speed and torque exceed the threshold torque and speed values;
determining if an interaxle differential (IAD) in the multi-function drive axle system is locked in order to determine if the second axle assembly is disengaged;
limiting engine torque or speed to produce an axle torque and speed corresponding to driveline damage values that do not exceed the driveline damage durability targets;
changing the gear ratio of the first axle assembly; and
upon determining that the second axle assembly is disengaged, re-engaging the second axle assembly, wherein the damage to the driveline includes damage to one or more gear teeth or damage to one or more bearings.

10. The method of claim 9, further comprising the steps of limiting the engine torque and speed to produce an axle torque and speed that do not exceed the threshold torque and speed values.

11. The method of claim 9, wherein the step of determining the axle torque and speed from sensors positioned on the multi-function drive axle system includes taking direct, non-predictive measurements of the axle torque and speed.

12. The method of claim 9, wherein the multi-function drive axle system is a tandem drive axle system.

13. The method of claim 9, wherein the damage to the gear teeth includes tooth bending or pitting.

14. The method of claim 9, further comprising the step of accumulating approximated driveline damage values to create a cumulative database utilized to adjust the driveline durability targets.

15. The method of claim 10, wherein the step of limiting the engine torque and speed includes overriding a throttle request by a vehicle operator.

* * * * *